United States Patent [19]
Yamagata

[11] Patent Number: 6,028,980
[45] Date of Patent: *Feb. 22, 2000

[54] IMAGE AND SOUND RECORDING APPARATUS USING A COMMON RECORDING HEAD AND AUDIO SIGNAL MEMORY

[75] Inventor: Shigeo Yamagata, Kanagawa-ken, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/280,149

[22] Filed: Jul. 25, 1994

Related U.S. Application Data

[63] Continuation of application No. 07/993,828, Dec. 18, 1992, abandoned, which is a continuation of application No. 07/863,386, Apr. 3, 1992, abandoned, which is a continuation of application No. 07/579,266, Sep. 6, 1990, abandoned, which is a continuation of application No. 07/180,249, Apr. 11, 1988, abandoned.

[30] Foreign Application Priority Data

Apr. 13, 1987 [JP] Japan ................................. 62-090391
Apr. 13, 1987 [JP] Japan ................................. 62-090392

[51] Int. Cl.[7] ........................................ H04N 5/91
[52] U.S. Cl. ............................... 386/96; 386/106
[58] Field of Search ................. 360/19.1, 35.1, 360/48, 61; 358/343, 908, 909, 906; 386/95, 96, 97, 98, 99, 100, 101, 102, 103, 104, 105, 106, 107, 108

[56] References Cited

U.S. PATENT DOCUMENTS

| | | | |
|---|---|---|---|
| 3,829,610 | 8/1974 | Meeussen et al. | 369/111 X |
| 3,924,062 | 12/1975 | Broadbent | 358/343 |
| 4,121,264 | 10/1978 | Kishi et al. | 360/27 X |
| 4,531,161 | 7/1985 | Murakoshi | 360/35.1 X |
| 4,571,641 | 2/1986 | Fujiki et al. | 360/19.1 |
| 4,602,296 | 7/1986 | Murakoshi | 360/35.1 X |
| 4,604,655 | 8/1986 | Moriyama | 358/343 |
| 4,725,897 | 2/1988 | Konishi | 360/35.1 X |
| 4,816,928 | 3/1989 | Sasaki et al. | 360/19.1 X |
| 5,014,136 | 5/1991 | Sakai et al. | 358/906 X |
| 5,047,869 | 9/1991 | Aoki et al. | 358/906 X |

FOREIGN PATENT DOCUMENTS

| | | | |
|---|---|---|---|
| 58-165486 | 9/1983 | Japan | 358/909 |
| 61-153803 | 7/1986 | Japan | 358/343 |

*Primary Examiner*—Andrew L. Sniezek
*Attorney, Agent, or Firm*—Robin, Blecker & Daley

[57] ABSTRACT

In an image recording apparatus for recording an image signal on a recording medium having a plurality of concentric circular tracks thereon, a method for recording on the medium sounds relative to the recorded image signal, is also provided wherein, the timing of recording the image signal arises before an audio signal has been taken into a memory for time compressing an audio signal over a full length of time for which the audio signal is recordable in an applicable recording track of the medium, with the image signal recording taking priority over the audio signal recording and the audio signal stored in the memory being allowed to be recorded on the recording medium after a given amount of the audio signal is completely taken into the memory.

15 Claims, 6 Drawing Sheets

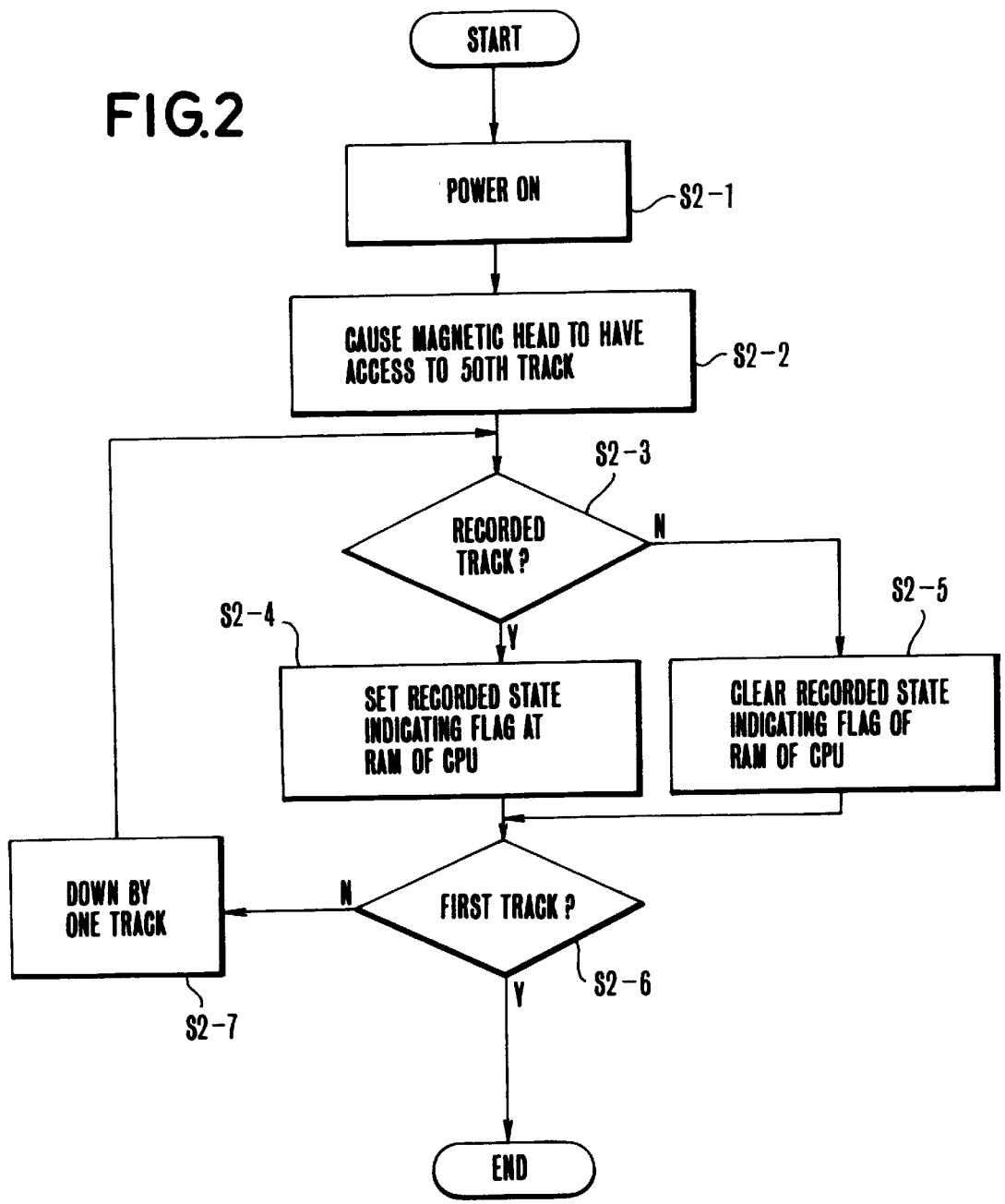

IMAGE AND SOUND RECORDING APPARATUS USING A COMMON RECORDING HEAD AND AUDIO SIGNAL MEMORY

This is a continuation-in-part continuation divisional application under 37 CFR 1.62 of prior application Ser. No. 07/993,828, filed Dec. 18, 1992, (aban.) which is a cont. of Ser. No. 07/863,386 filed Apr. 3, 1992 (aban.) which is a cont. of Ser. No. 07/579,266 filed Sep. 6, 1990 (aban.) which is a cont. of Ser. No. 07/180,249 filed Apr. 11, 1988 (aban.).

BACKGROUND OF THE INVENTION

1. Field of the Invention

This invention relates to an image and sound recording apparatus and more particularly to a sound recording method for the apparatus.

2. Description of the Related Art

Among image recording apparatuses of the kind recording sounds as well as images in concentric circular recording tracks on a magnetic sheet with one field portion of a video signal recorded in each of the tracks, some of them are arranged to record a time-compressed audio signal along with the video signal in proper correlation to the video signal on the same magnetic sheet; to add to the audio signal some data concerning the track numbers of tracks in which the correlated portions of the video signal are recorded and the time-base compression rate of the audio signal; and to record the audio signal with the data in tracks other than the video signal recording tracks.

In reproducing from the magnetic sheet the signals recorded by the recording apparatus in the above stated manner, the audio signal is time-expanded and the video signal corresponding to the audio signal is reproduced in accordance with the data added. Generally, the audio signal is time-compressed at one of three different rates, i.e. compressed by 320 times, 640 times or 1280 times, and the real time of the audio signal to be recorded and reproduced is about 5 sec, 10 sec or 20 sec.

It is possible to record the audio signal for about 5 to 20 sec in one track. However, a quite impractical occasion arises when one audio signal recording track is correlated to one video signal track, because in cases where image recording is arranged to be continuously performed at a rate of 0.5 sec per frame (i.e. two frames/sec), for example, each time one field portion of a field-recording video signal or two field portions of a frame-recording video signal is recorded, it would be an audio signal portion of only 0.5 sec that is recorded in one track, while the track has a capacity for recording the audio signal for a period of 5 to 20 sec. Therefore, only 1/10 of the audio signal recording capacity is actually used for sound recording.

Further, let us assume that a time-compressed audio signal is recorded in a suitable vacant track in recording an image and a sound relative to the image on a magnetic sheet. Then, in reproducing the record, if the magnetic sheet is loaded on a reproducing apparatus which is capable of only reproducing video signals, there arises the following problem: In case each of the records of the tracks is to be reproduced one by one to have, for example, the recorded images continuously monitored by feeding the tracks at a high speed, the tracks containing the audio signal are prone to be mistaken for the video signal tracks during the reproducing operation. This results in very unnatural reproduced images. This problem can be solved by muting the mistakenly reproduced audio signal output before it is supplied to an image monitor. Such a solution, however, presents another problem in that the reproduced image motion becomes unnatural due to discontinuity in the reproduction of the recorded images.

The above stated problems have been not limited to the recording apparatuses of the kind forming concentric circular recording tracks on a magnetic sheet but have arisen also in recording apparatuses of other kinds, such as the kinds using a plate shaped recording medium and a tape shaped recording medium.

SUMMARY OF THE INVENTION

In view of the above stated problems of the prior art, a first object of this invention is to provide an image and sound recording apparatus which is capable of efficiently using a recording medium.

Under this object, it is a second object of this invention to provide a recording apparatus which is capable of efficiently using the recording medium without wasting the recording capacity of the medium.

It is a third object of the invention to provide a recording apparatus which is capable of recording a large amount of an audio signal in recording the audio signal on a recording medium.

To attain this object, in an image recording apparatus for recording an image signal on a recording medium which has a plurality of concentric circular tracks formed thereon, a method for recording sounds relative to recording images is arranged according to this invention as a preferred embodiment thereof: To allow image signal recording to have priority over audio signal recording in cases where the timing for image signal recording arises before an audio signal portion requiring a full length of time for which the audio signal is recordable in an applicable track is taken into an audio signal time-compressing memory; and to record the audio signal on the recording medium when a given amount of the audio signal is taken into the memory. This method of allowing image signal recording to have priority over audio signal recording enables the image recording apparatus to more efficiently use the recording medium.

It is a further object of the invention to provide a recording apparatus which is capable of recording sounds and images in a manner suited for adequate reproduction of the image signal recorded under the first object mentioned above.

It is a further object of the invention to provide a recording apparatus which is capable of recording sounds and images in such a way as to permit easy reproduction of image and audio signals recorded under the first object mentioned above.

To attain the above stated object, an apparatus arranged as a preferred embodiment of the invention to record an image and a sound on a disk-shaped recording medium which has a plurality of concentric circular tracks comprises: recording means for recording an image and a sound on the recording medium; first control means for controlling the recording means to record one of an image and a sound in a track shifting serially from an outermost track toward an inner track of the medium; and a second control means for controlling the recording means to record another of the image and the sound in a track shifting serially from an innermost track toward an outer track of the medium.

More specifically, the above stated apparatus according to this invention is arranged in the following manner: In recording an image signal and an audio signal in the plurality of tracks of the disc shaped recording medium, the image signal is recorded, for example, in tracks located on the outer side of the disc shaped medium while the audio signal is recorded, for example, in tracks located on the inner side of the medium. Therefore, if it is desired to reproduce the recorded image alone, for example, the image signal is reproduced from the tracks one after another beginning with the outermost track. Therefore, continuous reproduction of the recorded image is easily controllable and thus can be accomplished at a high speed as desired.

It is a further object of this invention to provide a recording apparatus which, in cases where an image signal is to be consecutively recorded at given intervals on a recording medium, is capable of securing a desired area on the medium for recording any necessary information signal that corresponds to the image signal.

It is a still further object of this invention to provide a recording apparatus which is arranged to record signals in such a manner that, in reproducing an image signal consecutively recorded at given intervals on a recording medium, any reproduction commencing position on the medium can be efficiently detected.

Other objects and features of the invention will become apparent from the following detailed description of embodiments thereof taken in connection with the accompanying drawings.

BRIEF DESCRIPTION OF THE DRAWINGS

FIGS. 2, 3A and 3B are flow charts showing the operation of a CPU 48 included in the apparatus shown in FIG. 1.

DETAILED DESCRIPTION OF THE PREFERRED EMBODIMENTS

Preferred embodiments of this invention are as described below with reference to the drawings.

Figure 1:
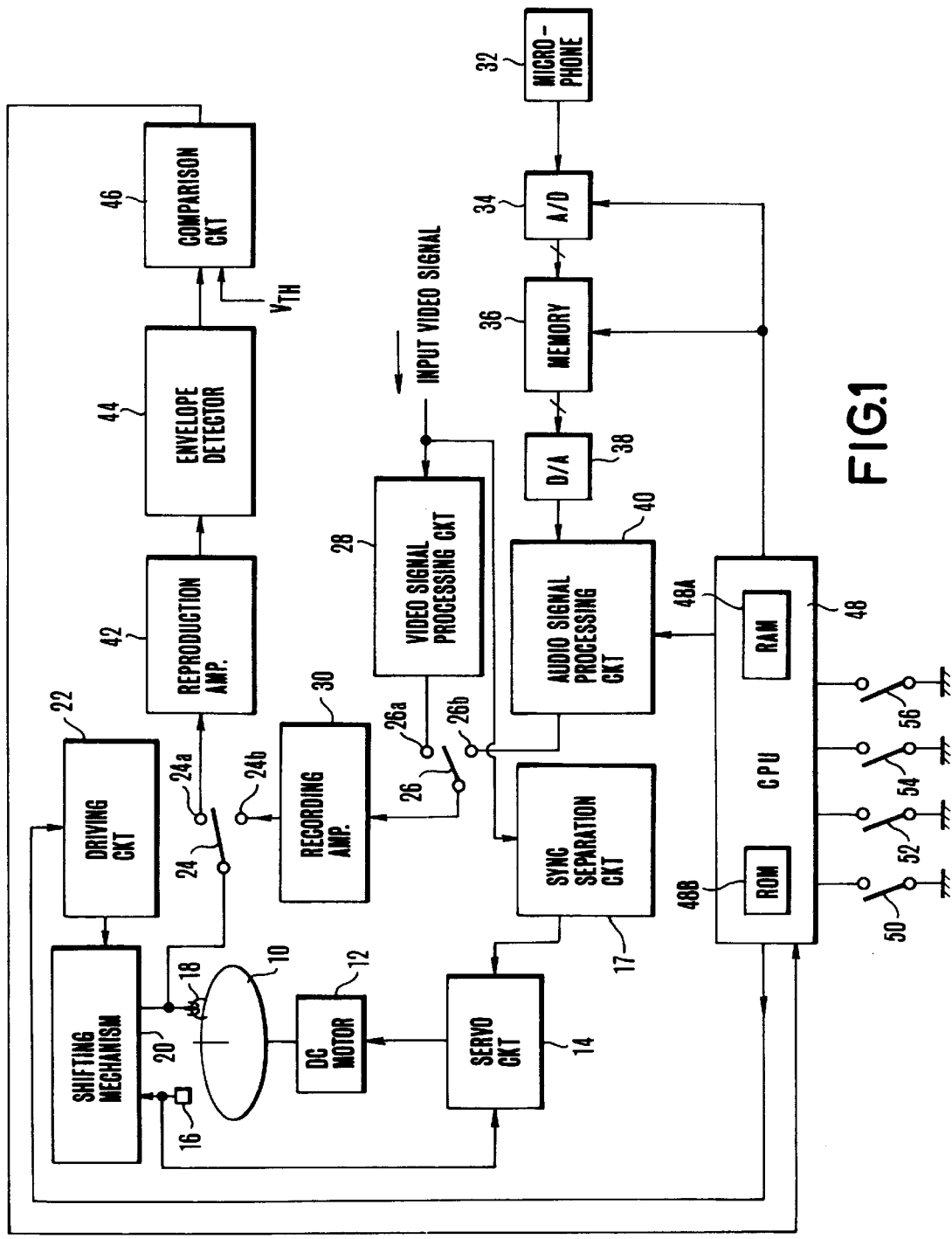
FIG. 1 is a block diagram showing an apparatus arranged as a first embodiment of this invention.

In FIG. 1 which shows the arrangement of a first embodiment, a magnetic sheet 10 is arranged to have 50 concentric circular recording tracks formed thereon. One field portion of a video signal or a given amount of an audio signal is recordable in each of the tracks. In this specific embodiment, a 50th track is located in the innermost position. A DC motor 12 is arranged to rotate the magnetic sheet 10. A servo circuit 14 is arranged to control the rotation of the motor 12.

A PG coil 16 is arranged to detect the rotation phase of the magnetic sheet 10. A sync separation circuit 17 is arranged to separate a synchronizing (sync) signal from an incoming video signal. The servo circuit 14 controls the magnetic sheet 10 to have it in a desired rotating state in accordance with a pulse signal produced from the PG coil 16 and the sync signal from the sync separation circuit 17. A magnetic head 18 is arranged to record a signal in the tracks of the magnetic sheet 10 and to reproduce a signal recorded on the magnetic sheet 10. A shifting mechanism 20 is arranged to radially move the magnetic head 18 over the magnetic sheet 10.

A driving circuit 22 is arranged to drive the shifting mechanism 20.

In this embodiment, the magnetic head 18 is arranged to perform combined functions of recording and reproducing video and audio signals. A switch 24 is arranged to switch the operation of the head 18 from recording over to reproduction and vice versa. A switch 26 is provided for a selection between audio signal recording and video signal recording. The connecting position of the switch 24 is on the side of a contact 24a for reproduction and on the side of another contact 24b for recording. The position of the switch 26 is on the side of a contact 26a for video signal recording and on the side of another contact 26b for audio signal recording.

A video signal processing circuit 28 is arranged to perform a signal processing operation on the input video signal for recording it including a frequency modulation process, etc. A reference numeral 32 denotes a microphone. An analog-to-digital (A/D) converter 34 is arranged to convert an audio signal coming from the microphone 32 into a digital signal. An audio signal memory 36 is arranged to temporarily store the digital audio signal by time-compressing it. A digital-to-analog (DIA) converter 38 is arranged to convert the output of the memory 36 into an analog audio signal. An audio signal processing circuit 40 is arranged to perform a recording signal processing operation on the output of the D/A converter 38 and to add some information about the time compression rate of the audio signal, the track number of a track in which the corresponding portion of the video signal is to be recorded, etc. The output of the audio signal processing circuit 40 and that of the video signal processing circuit 28 are arranged to be applied to the magnetic head 18 through the switch 26, a recording amplifier 30 and the switch 24.

In the case of the apparatus described, each of the tracks of the magnetic sheet 10 is checked for the recorded state or unrecorded state thereof at the beginning of the operation of the apparatus. A reproduction amplifier 42, an envelope detector 44 and a comparison circuit 46 are provided for this check. The track is considered to be in a recorded state if the output of the envelope detector 44 is larger than a comparison value VTH. In this case, the comparison circuit 46 produces a signal indicative of this condition.

A CPU 48 is arranged to control the overall operation of the apparatus. The CPU 48 comprises, for example, a ROM 48B which stores the operating program of the CPU 48, a RAM 48A which stores control variables, etc. More specifically, the CPU 48 is arranged to control the converting speed of the AID converter 34, change-over between reading (R) and writing (W) actions on the audio signal memory 36; and to supply the audio signal processing circuit 40 with information on the time compression rate and the track number of a track in which a video signal portion corresponding to an audio signal portion is recorded. Further, the CPU 48 is arranged, as will be described later, to receive the output of the comparison circuit 46 indicative of the result of comparison, to store the result of comparison in the recorded-state indicating flag table of the RAM 48A and to instruct the driving circuit 22 to move the head 18 accordingly.

A switch 50 is provided for instructing the apparatus to be on the stand-by for recording. A recording switch 52 is provided for instructing the apparatus to perform a recording action. A continuous shooting mode setting switch 54 is provided for instructing the apparatus to continuously record a video signal. A sound recording mode switch 56 is provided for instructing the apparatus to record sounds. The CPU 48 performs a control operation according to the states of these switches.

The operation of the apparatus which is arranged as described above is as follows: When the apparatus is loaded with the magnetic sheet 10 and a power supply is switched on, the CPU 48 becomes operative to perform an initial setting action as shown in FIG. 2. Referring to FIG. 2, the power supply is switched on or the magnetic sheet 10 is replaced with another sheet at a step S2-1.

At a next step S2-2, the CPU 48 causes the magnetic head 18 to have access to the last track or the 50th track of the sheet 10. Step S2-3: For this initial setting action, the position of the switch 24 is shifted to the contact 24*a* thereof. The CPU 48 checks the output of the comparison circuit 46 to find if the track to which the head 18 is having access is a recorded track. If so, the flow of operation comes to a step S2-4. Step S2-4: The recorded state indicating flag which is disposed within the CPU 48 is set. If the track is found to be in an unrecorded state at the step S2-3, the flow comes to a step S2-5. Step S2-5: The recorded state indicating flag is cleared. Steps S2-6 and S2-7: These steps are repeated until the head position comes to a first track on the magnetic sheet 10. Information as to which of the tracks on the loaded magnetic sheet 10 is in an unrecorded state is stored in the flag table of the RAM 48.

After completion of the process of initial setting action by the steps of FIG. 2, a video signal is recorded alone or in combination with an audio signal according to the positions of the recording stand-by switch 50, the recording switch 52 and the sound recording mode switch 56. The recording operation is performed in a manner as indicated by flow charts of FIGS. 3A and 3B.

Figure 3A:
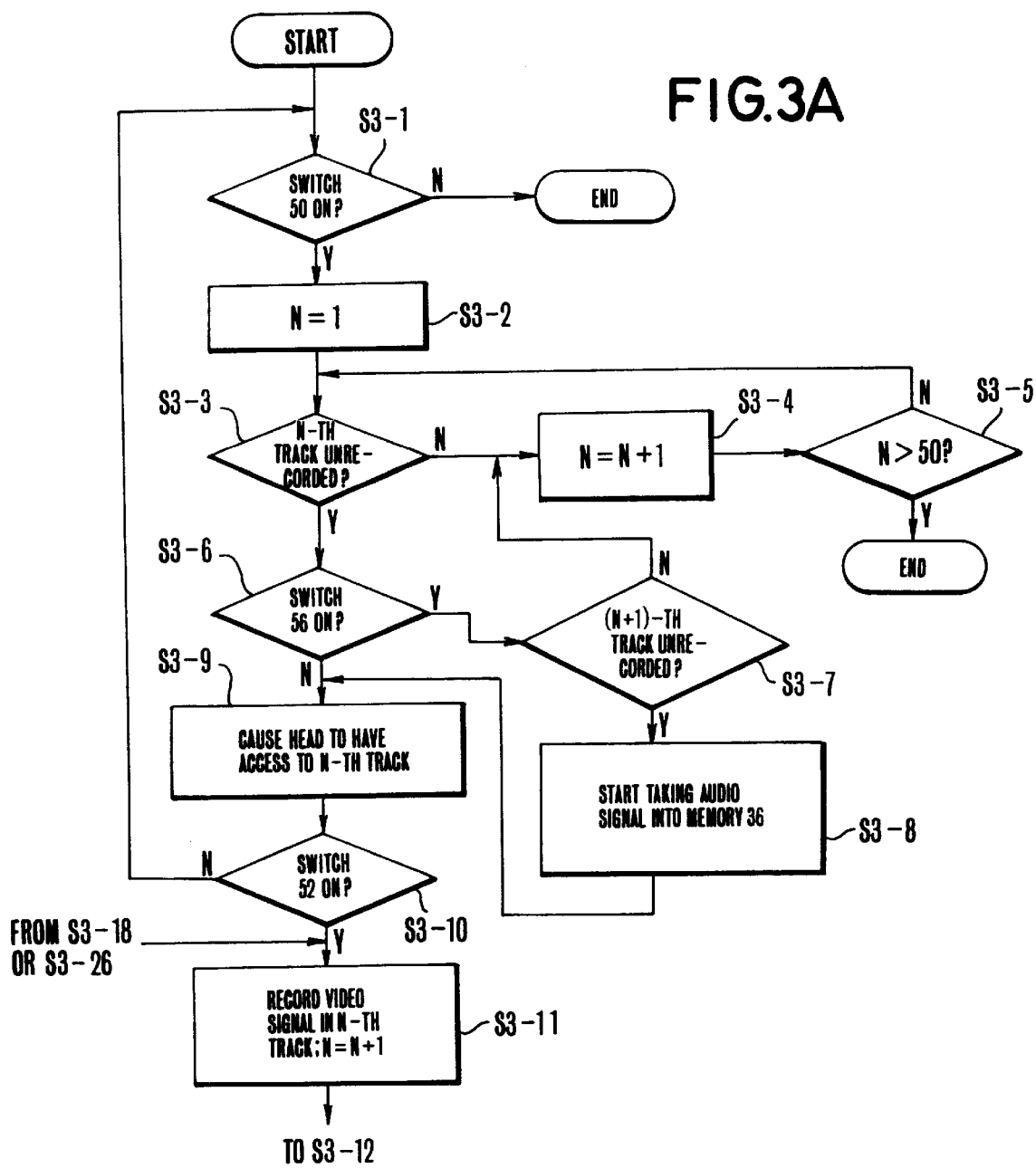
Figure 3B:
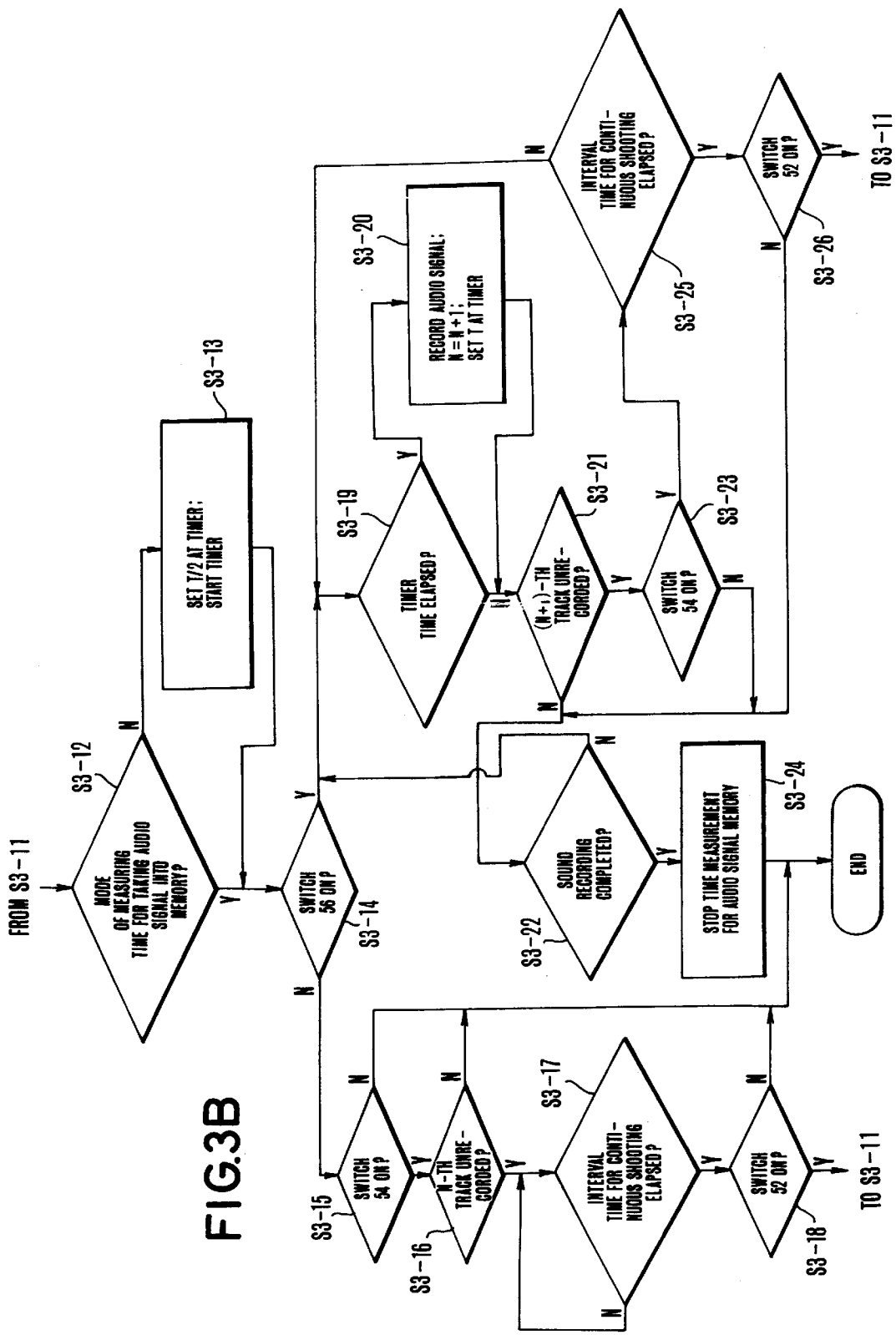

In the case of FIGS. 3A and 3B, the flow charts are shown on the assumption that the audio signal is recorded in a track located adjacent to and on the inner side of a track having the related portion of the video signal. Further, a reference symbol N denotes a track number of a track to which the head 18 is having access.

At a step S3-1: A check is made for the closed state (or on-state) of the recording stand-by switch 50. Upon detection of it, the flow of operation comes to a step S3-2. Steps S3-2, S3-3, S3-4 and S3-5: Making reference to the flag table mentioned in the foregoing, the CPU 48 checks the tracks N from a first to a 50th track for the unrecorded state of them one by one and causes the head 18 to be positioned at a track having the smallest track number among unrecorded tracks. In the event of no unrecorded track, the flow of operation comes to an end because recording is impossible. In that case, the operator may be informed of the absence of any unrecorded track by some suitable means arranged to light up an LED or to sound a buzzer. When an unrecorded track is found (at the step S3-3), the flow comes to a step S3-6. At the step S3-6: The sound recording mode switch 56 is checked. Step S3-7: If the switch 56 is found in an on-state, a next (N+1)-th track is checked to see if it is in a recorded state or in an unrecorded state. In other words, it is necessary for recording an audio signal to ensure that both the two adjacent tracks are in the unrecorded state. If the (N+1)-th track is found to be in a recorded state at the step S3-4, the track number N is incremented to find two consecutive unrecorded tracks. If the (N+1)-th track is found to be in an unrecorded state, the flow comes to a step S3-8. At the step S3-8: The audio signal begins to be taken into the memory 36. Step S3-9: The CPU 48 causes the driving circuit 22 to bring the head 18 to the N-th track. If the sound recording mode switch 56 is found to be in an off-state at the step S3-6, no sound recording is required. The flow, therefore, comes to a step S3-9. At the step S3-9: The head 18 is allowed to have access to the N-th track irrespective as to whether the (N+1)-th track is in an unrecorded state or in a recorded state.

Step S3-10: The recording switch 52 is checked. If the switch 52 is found to be in an on-state, the flow comes to a step S3-11. At the step S3-11: The video signal is recorded in the N-th track. If the switch 52 is found to be in an off-state, the flow comes back to the step S3-1 to repeat the routine described above. The video signal is recorded at the step S3-11 in the following manner: The connecting position of the switch 26 is shifted to its contact 26*a*. That of the switch 24 is kept at its contact 24*b* only during the process of recording to allow the output signal of the video signal processing circuit 28 to be applied to the head 18. In the embodiment-illustrated, the magnetic sheet 10 is allowed to rotate at a rate of 3,600 revolutions per minute for recording one field portion of the video signal in one track. The switch 24 is allowed to be on the side of the contact 24b for ⅟₆₀ sec. After recording, the head 18 is shifted inward (N=N+1).

At a step S3-12 ensuing the step S3-11, a check is made for a mode of measuring a length of time for taking the audio signal into the audio signal memory 36. If this mode is not selected, the flow comes to a step S3-13. At the step S3-13: A time value T/2 which is one half of an audio signal recordable length of time T is set at a timer disposed within the CPU 48. The reason for using the T/2 timer is as follows: The sounds to be recorded before and after the video signal are recorded at the same rate of time by writing the audio signal stored in the memory 36 for ⅟₆₀ sec. in one track of the magnetic sheet 10 after the lapse of the time T/2 following video signal recording. After the steps S3-12 and S3-13, the flow proceeds to a step S3-14. At the step S3-14: The flow of operation either proceeds to a routine for recording the video signal only (a step S3-15 and subsequent steps) or to a routine for recording both the video signal and the audio signal (a step S3-19 and subsequent steps) according to the on- or off-state of the sound recording mode switch 56.

At the step S3-15: A check is made for the position of the continuous shooting mode setting switch 54. If the switch 54 is found to be in the off-state (or open), the flow comes to an end. If the switch 54 is found to be in the on-state (closed), the flow proceeds to a step S3-16. At the step S3-16: The flag table is checked to find if the N-th track is in an unrecorded state. If so, the flow proceeds to a step S3-17. At the step S3-17: The flow waits for the lapse of a predetermined length of interval time for continuously shooting (0.5 sec. in the case of the embodiment illustrated). After the lapse of the interval time, if the recording switch 52 is found to be in an off-state, the flow comes to an end. If the switch 52 is found to be in an on-state, the flow comes back to the step S3-11 to perform video signal recording. The continuous recording continues until the head 18 either comes to have access to a recorded track or reaches the last track (the 50th track) as long as the recording switch 52 remains in its on-state.

In the case of the routine for recording the audio signal as well as the video signal, the flow of operation comes to the step S3-19 to check the timer which measures the taking-in time of the audio signal memory 36 for the lapse of the set time thereof. If the time is found to have elapsed, the flow proceeds to a step S3-20. At the step S3-20: The content of the memory 36 is read out to be recorded on the magnetic sheet 10. After the completion of the recording, the head 18 is shifted toward the inner side of the magnetic sheet 10, so that track number N is incremented. The time T is set at the timer. Sound recording is accomplished by reading out the stored audio signal from the memory 36 and by shifting the connecting position of the switch 24 to its contact 24*b* and that of the switch 26 to its contact 26*b*. In this instance, the audio signal processing circuit 40 adds data indicative of the track number of a video signal track at which recording begins and the compression rate of the audio signal to the audio signal produced from the D/A converter 38. In reproducing a signal recorded by this apparatus, therefore, the track number of the first of the tracks used for continuous recording can be readily found by just reproducing the audio signal. This is a great advantage. If the taking-in time of the memory 36 is found not to have elapsed as yet at the step S3-19, or after the step S3-20, the flow comes to a step S3-21 to make a check for the unrecorded state of the (N+1)-th track located on the inner side of the N-th track to which the head presently has access. If the (N+1)-th track is found to be in a recorded state, the flow proceeds to a step S3-22. If not, the flow comes to a step S3-23.

At the step S3-22, a check is made for the completion of audio signal recording. If not, the flow comes back to the step S3-19. If the audio signal recording is found to have been completed, the flow of operation comes to a step S3-24 to bring the time measuring action for the audio signal memory 36 to a stop. The flow of operation then comes to an end. At the step S3-23, the continuous shooting switch 54 is checked for its on- or off-state. If it is found to be in the off-state, the flow comes to the step S3-22. If the switch 54 is found to be in the on-state, the flow proceeds to a step S3-25. At the step S3-25, a check is made for the lapse of the continuous shooting interval time (0.5 sec.). If the interval time is found to have not elapsed as yet, the flow comes back to the step S3-19. If the time is found to have elapsed, the flow comes to a step S3-26. At the step S3-26, the recording switch 52 is checked for next video signal recording. If the switch 52 is found to be in an on-state at the step S3-26, the flow comes back to the step S3-11 to perform video signal recording. If not, video signal recording is not required and the flow comes to the step S3-22 for audio signal recording.

In short, the video signal is alone recorded if the audio recording mode is not selected. If the continuous shooting (or continuous recording) mode is not selected in this instance, the video signal recording comes to an end upon completion of recording one field portion of the video signal. However, if the continuous shooting mode is selected, the video signal is repeatedly recorded at the given recording intervals so long as the recording switch 50 remains in its on-state until the head 18 arrives at a recorded track or at the end of the last track.

In cases where the sound recording mode is selected, the operation of the embodiment is performed in different manners depending on the selection or nonselection of the continuous shooting mode. If the continuous shooting mode is not selected, each of the audio signal portions before and after the video signal is recorded along with the video signal in a track adjacent to the video signal recording track respectively for a period of time which is ½ of an audio signal recordable length of time. In the event of selection of the continuous shooting mode, although each of the audio signal portions before and after the first portion of the video signal is recorded along with the video signal also in the track adjacent to the video signal recording track for the period of time which is ½ of the audio signal recordable length of time, the continuous video signal recording has priority over the audio signal recording if the interval time of continuous recording is shorter than ½ of the audio signal recordable time. In that event, the audio signal is allowed to be recorded only after the lapse of a given sound taking-in time. Further, even in that event, if the audio signal recording track is found to be in a recorded state, the continuous video signal recording action comes to an end. Therefore, image recording can be prevented from being performed without sound recording.

Further, with the sound recordable time T set at the timer which is arranged to measure the taking-in time of the audio signal memory 36 after the end of audio signal recording at the step S3-20 of FIG. 3B, so that the audio signal can be recorded continuously in two or more than two tracks without the fear of duplicate audio signal recording in the case of continuous video signal recording so far as the switch 52 is closed.

In the foregoing description, the field recording arrangement for recording one field portion of the video signal in one track is taken up by way of example. However, this invention is not limited to this but is also applicable to an apparatus arranged to be capable of performing also frame recording as well as field recording. The track to be used for recording the audio signal of course can be any track so long as it is in an unrecorded state.

In the embodiment described, the audio signal is arranged to be recorded in a track located adjacent to a video signal recording track. However, this arrangement may be changed to record the audio signal in tracks one by one from an innermost track and by shifting the recording track toward the outer circumference of the magnetic sheet 10 while the video signal is arranged to be recorded in tracks beginning with the outermost track. It is an advantage of this modification that, in cases where the video signal is alone recorded or where only the video signal is to be reproduced without reproducing the audio signal recorded, the video signal can be adequately reproduced by a reproducing apparatus which is not arranged to be capable of reproducing any audio signal.

Another embodiment which hereinafter will be called the second embodiment of the invention and which performs recording in the above stated modified manner is arranged as follows: In this case, the image and sound recording apparatus is arranged according to this invention to permit smooth reproduction of recorded images. The hardware arrangement of the embodiment is similar to that of the embodiment shown in FIG. 1 (the first embodiment) and is therefore omitted from description. Further, the embodiment is provided with a CPU which is arranged to perform a flow of operation in a manner similar to the CPU 48 of FIG. 1. The features of the operation of the second embodiment will be understood from FIGS. 4A and 4B which are flow charts. These flow charts differ from the flow charts of FIGS. 3A and 3B in that there is provided a variable M for designating an audio signal recording track and that a check is made to prevent the audio signal recording track from overlapping the video signal recording track. More specifically, in the case of the second embodiment, steps from S4-1 to S4-10 are added to the flow of operation of the first embodiment.

Figure 4A:
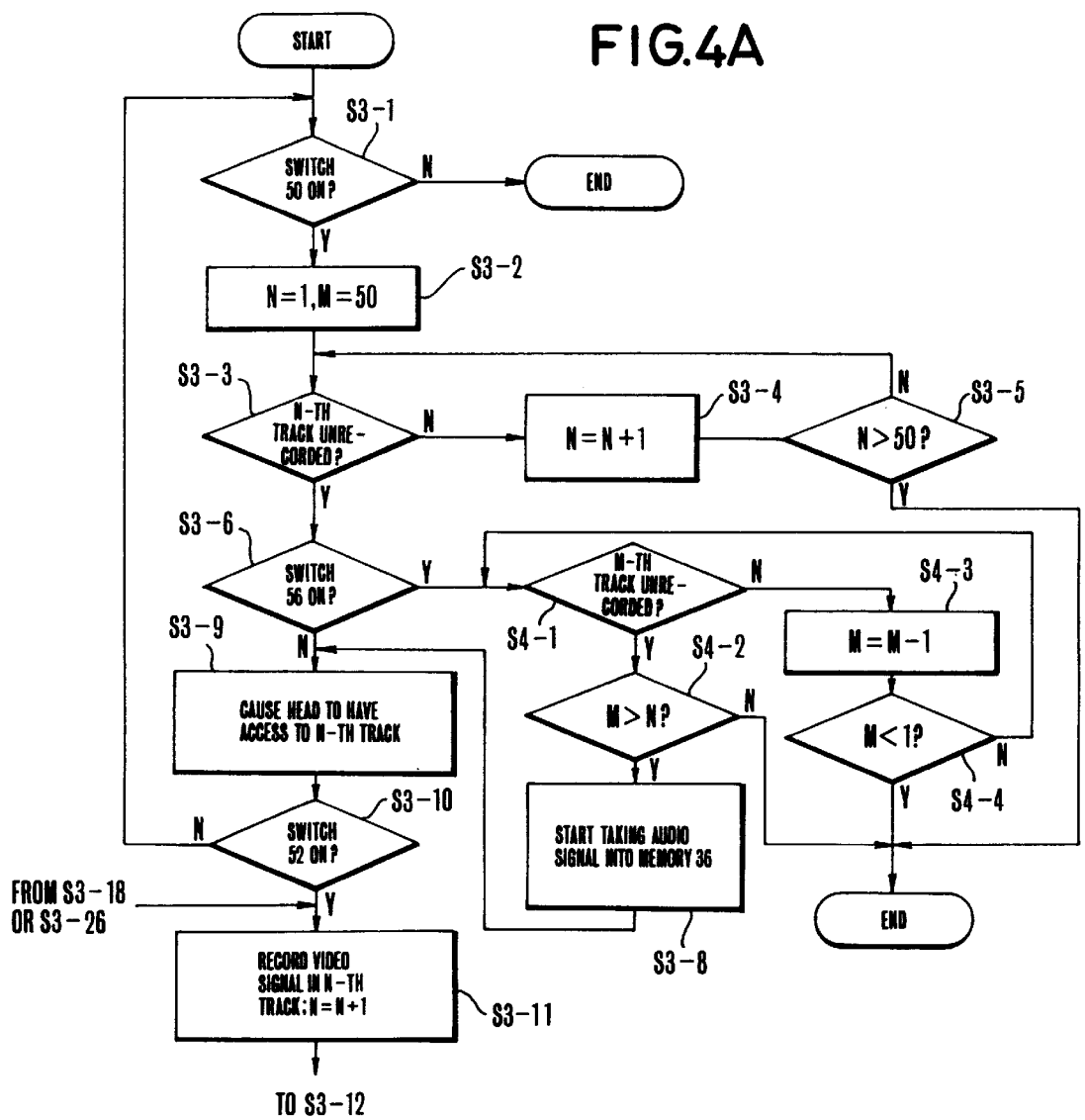
FIGS. 4A and 4B are flow charts showing the operation of a CPU 48 included in a second embodiment of the invention.
Figure 4B:
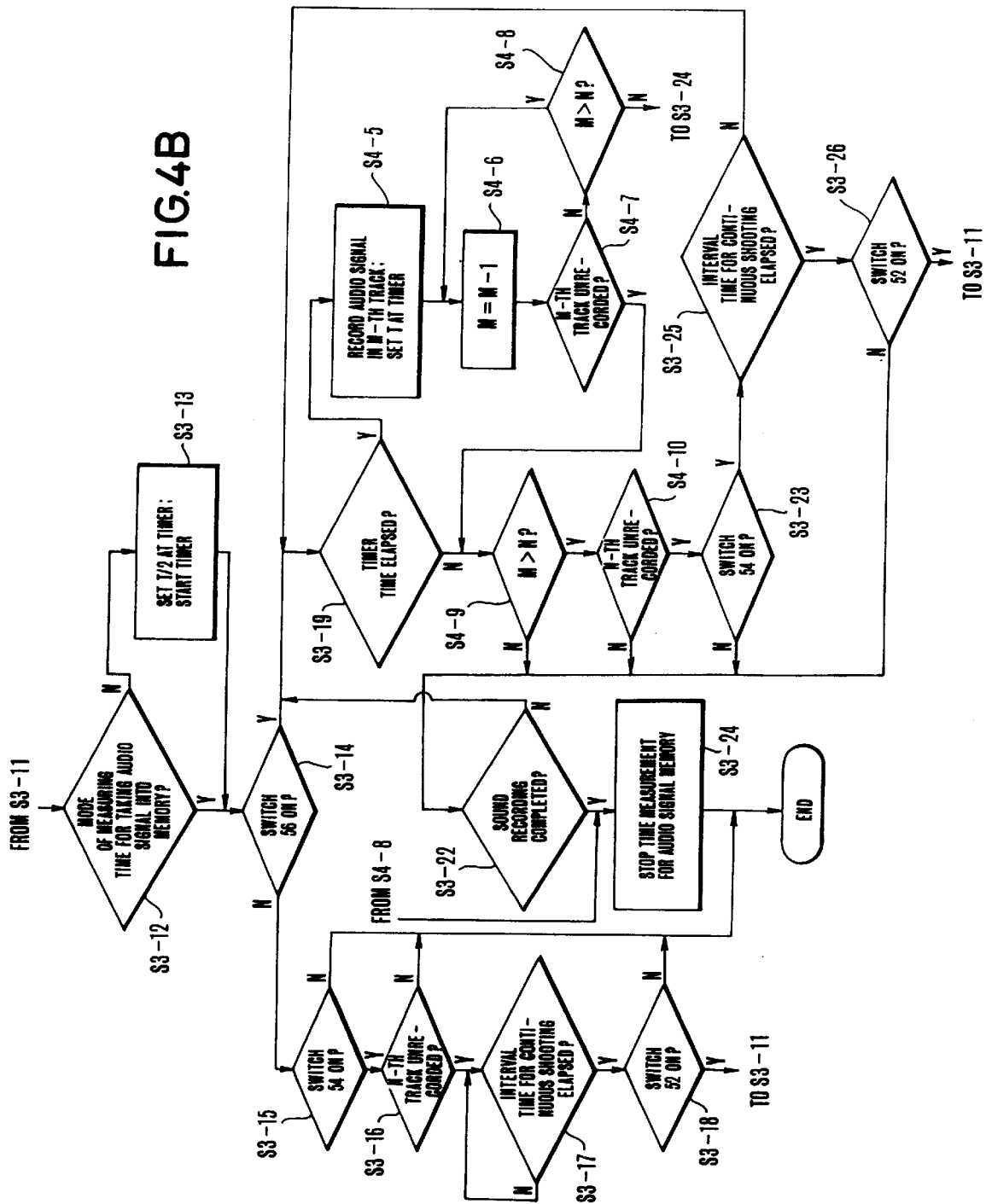

Referring to FIGS. 4A and 4B, a reference symbol N denotes the track number of each track to which the head 18 is going to have access or already has access for recording the video signal in the same manner as in the case of FIGS. 3A and 3B; and a symbol M denotes the track number of each of audio signal recording tracks.

At a step S3-1: A check is made for the on-state of the recording stand-by switch 50. Step S3-2: Upon detection of the on-state of the switch 50, the track numbers are initialized by shifting the video signal recording track number N to "1" and the audio signal recording track number M to the 50th track which is located in the innermost position on the magnetic sheet 10. Steps S3-3, S3-4 and S3-5: The CPU 48 increases the track number N from 1 to 50 one by one and looks up an unrecorded track of the smallest track number among the unrecorded tracks by checking the flag table mentioned in the foregoing. If no unrecorded track is found (N>50), the flow of operation comes to an end as recording is impossible. In this case, the operator may be informed of the absence of any unrecorded track on the magnetic sheet 10 by lighting up an LED or sounding a buzzer in the same manner as in the case of FIGS. 3A and 3B. In case any unrecorded track is found through the look-up made at the steps S3-3 to S3-5, the flow comes to a step S3-6 to check the sound recording mode switch 56. If the sound recording mode switch 56 is found closed (on), the flow comes to a step S4-1. Steps S4-1, S4-2, S4-3 and S4-4: A check is made for the possibility of audio signal recording by decreasing the variable M one by one from 50 in such a way as to find the presence of any unrecorded track that has a track number larger than the track number N. If no recordable track is found, that is, in the event of M≦N or M<1, the flow of operation comes to an end from the step S4-4 or from S4-2. If any recordable track (or area) is found, the flow comes to a step S3-8. At the step S3-8, the audio signal begins to be taken into the memory 36. Step S3-9: Then, the CPU 48 causes the driving circuit 22 to bring the head 18 to the N-th track. If the sound recording mode switch 56 is found open (in an off-state) at the step S3-6, the head 18 is allowed to have access to the N-th track at the step S3-9 without making the search for an audio signal recordable track as audio signal recording is not required.

Step S3-10: After the step S3-9, the recording switch 52 is checked. If the switch 52 is found closed (or in an on-state), the flow proceeds to a step S3-11, where the video signal is recorded in the N-th track. If not, the flow comes back to the step S3-1 to repeat the above stated routine. At the step S3-11, the video signal is recorded in the same manner as in the case of FIGS. 3A and 3B. Ensuing steps S3-12 to S3-18 are similar to the corresponding steps shown in FIG. 3B and thus require no further description here.

In the case of a routine for recording an audio signal along with a video signal, the flow of operation is as follows: At a step S3-19, the timer is arranged to measure the taking-in time of the audio signal memory 36 for the lapse of the set length of time thereof. If so, the flow comes to a step S4-5. At the step S4-5, the content of the memory 36 is read out and recorded in the M-th track of the magnetic sheet 10. Then, the time T is set at the timer. When sound recording is to be performed for the first time, the track number M is set at 50. The initial recording of sounds is made in the innermost track. In performing sound recording, the audio signal stored in the memory 36 is read out and the connecting positions of the switches 24 and 26 are shifted to their contacts 24b and 26b, respectively, in the same manner as in the case of FIGS. 3A and 3B. Then, the audio signal processing circuit 40 adds data for the track number of the track in which the video signal has begun to be recorded and for the sound compressing rate of the audio signal to the audio signal produced from the D/A converter 38.

Steps S4-6 to S4-8: After the step S4-5, an unrecorded track of a track number M which is larger than the track number N is looked up with the track number M decremented one by one by allowing the head to have access to tracks beginning with a track located in the innermost position on the magnetic sheet 10. When the track number M becomes equal to the track number N (M=N), it indicates that there is no unrecorded track on the magnetic sheet 10. In that event, the flow comes to a step S3-24 to terminate sound recording.

In cases where the timer time is found to have not elapsed at the step S3-19 or where an unrecorded track is found at the step S4-7, the flow comes to a step S4-9 to make a check to see if the track number M is larger than the track number N. In the event of M≦N, it indicates presence of no recordable track. In that event, therefore, the flow comes to a step S3-22 to decide whether the sound recording is to be terminated. In the case of M>N, the flow comes to a step S4-10 to make a check for an unrecorded state of the N-th track. At the step S4-10, if the N-th track is found to be in a recorded state, the flow comes to the step S3-22. If the N-th track is found to be in an unrecorded state, the flow proceeds to a step S3-23. The steps from S3-22 to S3-26 are similar to the corresponding steps of FIG. 3B and, therefore, do not require further description.

In the case of the second embodiment described above, if the apparatus is set in the sound recording mode, the video signal is recorded in tracks one by one beginning with an unrecorded track which is-located in the outermost position among them while the audio signal is recorded in tracks one by one beginning with an unrecorded track located in the innermost position among the audio signal recording tracks. With the continuous shooting mode not selected, audio signal portions before and after each video signal portion are recorded along with the video signal respectively for periods of time each of which is ½ of the audio signal recordable time. In the event of selection of the continuous shooting mode, the audio signal portions before and after the initial portion of the video signal are likewise recorded for the periods each of which is ½ of the audio signal recordable time. However, if the interval time of the continuous shooting is shorter than ½ of the audio signal recordable time, the continuous recording of the video signal is allowed to have priority and the audio signal recording is allowed only after the lapse of a given length of sound taking-in time.

Further, in the case of the second embodiment, it is after the termination of sound recording at the step S4-5 of FIG. 4B that the sound recordable time T is set at the timer which measures the length of time for taking the audio signal into the audio signal memory 36. This arrangement prevents the audio signal from being duplicatively recorded so that a given time length portion of the audio signal for two or more consecutive tracks can be recorded in the event of continuous image recording.

The second embodiment is arranged to use a disc shaped recording medium. However, this invention is not limited to the use of such a recording medium. In accordance with the invention, tape- and card-shaped recording media are also usable. Further, a solid state memory such as a semiconductor memory or a Bloch line memory or the like may be used.

In the case of the apparatus (the first embodiment) shown in FIG. 1, a single head 18 is used for recording the video and audio signals. However, a plurality of heads may be discretely arranged for these signals. The latter head arrangement is advantageous in respect to the head access time although it is somewhat disadvantageous in terms of the cost of the apparatus.

The embodiments described are arranged to determine the timing of audio signal recording by means of the timer which measures the audio signal taking-in time. However, this arrangement may be changed to detect that the audio memory is filled with audio data and to carry out sound recording according to a detection signal thus obtained. In the case of this modification, however, ½ of the content of the audio signal memory 36 is cleared at the step S3-13 instead of setting a period of time T/2 at the above stated timer. Then, at the step S4-5, the whole content of the memory 36 is cleared instead of setting the time T at the timer.

As is readily understood from the foregoing description, the images recorded by this embodiment of the invention can be adequately reproduced and displayed even by a reproducing apparatus which is arranged to be capable of reproducing only images. Further, in cases where the images recorded by the embodiment are to be continuously reproduced, the speed of continuous reproduction can be increased. Besides, a control circuit arrangement required for that purpose can be simplified.

While, in the above embodiments, a disc-shaped medium is used as a recording medium, this invention is not limited to an apparatus using such a recording medium. In accordance with the invention, a tape-shaped recording medium may be used as described above. In addition, a solid state memory such as a semiconductor memory or a Bloch line memory also may be used.

Further, while, in the above embodiments, an apparatus for handling an audio signal and an image signal has been shown and described, the kind of information to be handled by the apparatus of the invention is not limited to such signals. Other kinds of information also may be handled.

What is claimed is:

1. A recording apparatus for recording on a recording medium a first information signal and a second information signal which is made related to said first information signal, comprising:
   a) first information signal record starting instruction means operable for instructing to start a recording action of recording said first information signal on said recording medium;
   b) second information signal record starting instruction means operable for instructing to start a recording action of recording said second information signal on said recording medium;
   c) information signal storing means for starting an operation of writing said second information signal into a memory in response to an instruction of starting to record said second information signal imparted by said second information signal record starting instruction means;
   d) recording means for receiving either said first information signal or said second information signal and recording either the received first information signal or the received second information signal on the recording medium; and
   e) control means for controlling the recording means, when an instruction is so given by said first information signal record starting instruction means as to start a recording action of recording said first information signal on said recording medium, before a predetermined amount of said second information signal is stored into said memory in said information signal storing means in response to said second information signal record starting instruction means, to cause said first information signal to be recorded in precedence on said recording medium, and after said predetermined amount of said second information signal is stored into said memory, to cause said second information signal stored in said memory to be recorded on said recording medium.

2. An apparatus according to claim 1, wherein said first information signal is an image signal.

3. An apparatus according to claim 2, wherein said second information signal is an audio signal related to said image signal.

4. An apparatus according to claim 1, wherein said recording means includes:
   a) a recording head for recording said first information signal and said second information signal; and
   b) moving means for moving said recording head and said recording medium relative to each other.

5. An apparatus according to claim 1, wherein said recording medium is a disc-shaped recording medium.

6. An apparatus according to claim 5, wherein said recording means is arranged to record said second information signal at a location radially interiorly on disc-shaped recording medium than a location on said disc-shaped recording medium on which the first information signal is recorded.

7. An apparatus according to claim 1, wherein said first information signal is a still image signal and said recording means is arranged to consecutively record a predetermined of pictures of said still image signal on said recording medium.

8. An apparatus according to claim 1, wherein said recording means is arranged to effect recording by using a common recording head.

9. A recording method for recording on a recording medium a first information signal and a second information signal which is made related to said first information signal, comprising the steps of:
   a) first information signal record starting instruction step of instructing to start a recording action of recording said first information signal on said recording medium;
   b) second information signal record starting instruction step of instructing to start a recording action of recording said second information signal on said recording medium;
   c) information signal storing step of starting an operation of writing said second information signal into a memory in response to an instruction of starting to record said second information signal imparted in said step b); and
   d) recording step of, when an instruction is so given in said step a) as to start a recording action of recording said first information signal on said recording medium, before a predetermined amount of said second information signal is stored in said memory in step c) causing said first information signal to be recorded in precedence on said recording medium, and after said predetermined amount of said second information signal is stored into said memory, causing said second information signal stored in said memory to be recorded on said recording medium.

10. A method according to claim 9, wherein said first information signal is selected to be an image signal.

11. A method according to claim 10, wherein said second information signal is selected to be an audio signal related to said image signal.

12. A method according to claim 9, wherein said recording medium is selected to be a disc-shaped recording medium.

13. A method according to claim 12, wherein a recording area for said second information signal is selected to be radially interiorly on said recording medium than a recording area for said first information signal.

14. A method according to claim 9, wherein said first information signal is selected to be a still image signal and wherein said first information signal recording step is practiced to consecutively record a predetermined number of image plane portions of said still image signal on said recording medium.

15. A method according to claim 9, wherein said steps c) and d) are practiced by using a common recording head.

* * * * *

UNITED STATES PATENT AND TRADEMARK OFFICE
CERTIFICATE OF CORRECTION

PATENT NO. : 6,028,980
DATED : February 22, 2000
INVENTOR(S) : Shigeo Yamagata

It is certified that error appears in the above-identified patent and that said Letters Patent is hereby corrected as shown below:

Col. 4, line 17, delete "(DIA)" and insert -- (D/A) --.
Col. 4, line 44, delete "AID" and insert -- A/D --.
Col. 6, line 10, delete "embodiment-illustrated" and insert -- embodiment illustrated --.
Col. 10, line 16, delete "is-located" and insert -- is located --.

Signed and Sealed this

Twenty-sixth Day of December, 2000

Attest:

Q. TODD DICKINSON

*Attesting Officer*   *Director of Patents and Trademarks*